United States Patent [19]

Müller et al.

[11] Patent Number: 5,029,149

[45] Date of Patent: Jul. 2, 1991

[54] OBJECT CAPPED BY A PROTECTIVE LAYER

[75] Inventors: Jacques Müller, Reconvilier; André Triponez, Lamboing, both of Switzerland

[73] Assignee: ETA S.A. Fabriques d'Ebauches, Grenchen, Switzerland

[21] Appl. No.: 572,548

[22] Filed: Aug. 27, 1990

[30] Foreign Application Priority Data

Aug. 25, 1989 [CH] Switzerland ........................ 03086/89

[51] Int. Cl.[5] ........................ G04B 37/00; C03C 27/02

[52] U.S. Cl. ........................................ 368/280; 428/632

[58] Field of Search .................. 368/88, 276, 280, 294, 368/295; 428/622, 623, 632, 333; 63/3

[56] References Cited

U.S. PATENT DOCUMENTS

| | | | |
|---|---|---|---|
| Re. 28,527 | 8/1975 | Kushida | 58/88 G |
| 4,375,391 | 3/1983 | Kushida | 204/35 N |
| 4,419,409 | 12/1983 | Kushida | 428/469 |
| 4,640,625 | 2/1987 | Kushida | 368/280 |

FOREIGN PATENT DOCUMENTS

| | | |
|---|---|---|
| 2360112 | 2/1978 | France . |
| 59-40916 | 3/1984 | Japan . |
| 2071153 | 9/1981 | United Kingdom . |

OTHER PUBLICATIONS

Horological Journal, No. 111, Aug. 1968, pp. 22-24.

*Primary Examiner*—Vit W. Miska
*Attorney, Agent, or Firm*—Griffin Branigan & Butler

[57] ABSTRACT

An object, which is particularly destined for use in horology or jewelry, includes a substrate which constitutes the framework and which is preferably formed from injected cast aluminium. A decorative and protective coating overlays the substrate, such coating consisting of a deposit of a first layer of aluminium in a substantially pure state and a second layer capping the first, said second layer being constituted of aluminium oxide formed from the first layer. The object may be a watch case or a bracelet link.

9 Claims, No Drawings

OBJECT CAPPED BY A PROTECTIVE LAYER

This invention concerns a decorative or useful article, particularly intended for use in horology or in jewelry, and which includes a metallic substrate constituting the framework of the object and a protective coating capping said substrate, at least in part to render it insensitive to external constraints which may occur.

BACKGROUND OF THE INVENTION

It is usual to protect objects against external constraints, physical as well as chemical, by means of protective coatings generally consisting in deposits of thin layers employing for instance nickel or chromium. A particularly effective coating having an attractive appearance consists of covering the object by aluminium oxide if the base substrate is of pure aluminium or an alloy thereof.

The Japanese patent publication JP-A-59-40 916 describes such a treatment for a watch case the substrate of which is formed of an alloy of aluminium. This treatment consists of anodically oxidizing the substrate in a solution of 10 -20% of sulphuric acid maintained between −4 and 10° C., in which solution air is introduced in order to agitate it. The electrical potential and current density are progressively increased from 24 to 90 V and from 2 to 7 A/dm$^2$ respectively, in a manner such that a layer of aluminium oxide is created which exhibits crystalline growths at the surface of the substrate. The oxide layer is thereafter impregnated by an aqueous liquid containing a fluorocarbon polymer having particles in the form of grains, the dimension of which is smaller than 2 μm and which place themselves between the crystalline excrescences in order finally to fill up the holes between said excrescences. Thanks to this procedure, the wear resistance of the visible parts of the watch case is improved.

Apart from the interesting details which it divulges, the cited publication does not indicate that it is necessary in order to obtain a regular coating presenting the attractive satin matt aspect which belongs normally to the anodization of aluminium to practise such anodization on an aluminium substrate which is substantially pure or at least lacking elements which could spoil the fine aspect. The patent document US-A-4 640 625 puts the finger on this necessity. Effectively in this document it is shown that the watch case formed of an anodized aluminium alloy contains less than 0.01% of silicon and less than 0.01% of iron (by weight). This low value of silicon and iron effectively permits one to avoid diminution of the brilliance of the anodized layer.

In an article entitled "All That Glitters" from the "Horological Journal" No. 111, Aug. 1968, pages 22–24, it is also indicated that in order to anodize a watch case formed of aluminium, it is essential to have available a material the purity of which is 99.99% if one wishes to obtain good results.

The same observations appear in the patent documents FR-A-2 360 112 and US-E-28527 in which, for the first, the watch part is moulded in pure aluminium under pressure and, for the second, the parts are massively formed with 99.8% of pure aluminium.

SUMMARY OF THE INVENTION

From the teaching of the four documents cited hereinabove, there results thus that in order to anodize successfully an object such as a watch case, the substrate of which is formed in aluminium, it is necessary to have available a relatively pure material. However, it is in no manner suggested that this substrate could be formed of a material other than pure aluminium as for instance steel, brass or again from cast aluminium, which then could be covered by a first layer of aluminium in a substantially pure state, then by a second layer covering the first, said second layer being constituted by aluminium oxide formed from the first layer as the present invention proposes.

Several embodiments of the invention are now going to be described which constitute non-limiting examples of the invention and which show the advantages brought by such invention.

EXAMPLE NR. 1

This first Example is a preferred embodiment of the invention in which the substrate which forms the framework of the object to be manufactured is obtained by means of an aluminium casting which may be poured or injected into a mould in order to give it its definitive form.

Should it concern manufacturing a caseband for a watch case for instance, one could start off with a bar of pure aluminium, cut such bar into slices and machine each slice in order to give it the form desired. There would then be no problem to anodize the object in order to obtain the surface state resistant to exterior constraints which occur during normal usage, such as for instance mechanical stresses (shocks, scratches) or chemical constraints (sweat). For very simple forms, this method may be envisaged, although the machining operation remains long and costly. An example of such machining may be found in the FLIK-FLAK watch (registered trademark) wherein the case includes a round back cover-caseband formed from a single piece. Once the back cover-caseband is machined, it is then anodized and coloured.

Should one decide to have recourse to injected cast aluminium, one is liberated from all mechanical machining since the watch case comes out of the mould in its definitive form. One may then envisage the most varied forms (squared off case, round case, but with several different radii of curvature). If the bracelet is attached to the case by means of lugs, these latter could also be formed from the mould so as to be integral with the case. One thereby avoids a substantial number of machining operations.

Cast aluminium however exhibits a high content of silicon which is present in order to facilitate moulding. This high silicon content, between 5 and 22% by weight, gives rise to a major difficulty when it is a matter of anodizing the moulded part. In effect, the particles of silicon prevent regular anodization and the result is an irregular surface exhibiting stripes or mottling bringing about a surface state which is not utilizable for the sale of the object.

To overcome this difficulty, the present invention proposes then to coat the part of cast aluminium with a first layer of aluminium in a substantially pure state, for which the content by weight of silicon is low, for instance less than 0.5%. This first deposit may be brought about by ordinary electroplating but could also be obtained by another method, for instance physical deposition in the vapour phase (PVD).

Onto this first layer of aluminium in a substantially pure state, there will be no longer any difficulty to obtain a second layer of aluminium oxide (anodization)

itself formed from the first layer. It has already been mentioned above vis-à-vis the Japanese patent publication JP-A-59-40 916 how one goes about creating said second layer. The aluminium oxide surface is produced by electrolysis in employing the metal as anode. The second layer may present a thickness comprised between 2.5 and 200 μm. In place of sulphuric acid one may also employ oxalic acid or again a chromic acid.

It has already been said that the second oxide layer enables one to provide an object of great surface hardness and resistant to chemical agents. This second layer also has the advantage that it may be coloured either by tinting within the layer, or by adding different metals to the oxidation bath. One may add that if a layer having a thickness of 10 μm is necessary in order to resist corrosion and wear, it will be necessary to have a thickness of at least 20 μm in order to obtain a good colouring.

The example described hereinabove concerns a watch case. It is evident that the object in question could be another decorative object. This might be for instance a bracelet link which could be moulded with a form as complicated as one may wish and which moreover is often the case for links which are fitted into one after another.

EXAMPLE NR. 2

Instead of being formed of cast aluminium as explained in Example Nr. 1, the substrate of the second example is formed from cast zinc. Here one employs preferably an alloy of the Zamak type (registered trademark) which includes by weight 3 to 6% of aluminium, 1.2 to 3.2% of copper and traces of other metals. The cast metal is poured or injected into a mould, then the substrate as obtained is coated with the same layers as those which have been described for Example Nr. 1. Cast zinc exhibits the same advantages as cast aluminium in the sense that the object obtained does not need to be machined since it is obtained directly in its final form.

EXAMPLE NR. 3

Here one forms a substrate of steel which one machines to the forms and dimensions as desired. As soon as the machining is terminated, one coats the substrate with the two layers described under Example Nr. 1. If the machining shows the disadvantages mentioned hereinabove, the anodized aluminium coating presents on the other hand the advantages which have been cited: hardness, fine matt satin aspect and eventually colouring.

EXAMPLE NR. 4

The substrate is formed of brass which one machines subsequently. Following machining, one coats the substrate with the two layers described under Example Nr. 1. This embodiment exhibits the same advantages and difficulties mentioned with respect to Example Nr. 3.

FINAL REMARK

The object of the invention proposes, as has been seen from all the examples set forth hereinabove, the deposit of a layer of substantially pure aluminium on the substrate. If the deposit is effected by galvanic plating, the electrode or electrodes employed to this end will leave, following plating, one or several places on the substrate which will not have been covered by the first layer of aluminium. If the substrate is of cast zinc, of steel or brass, the operation following anodic oxidation will bring about chemical attack of the substrate at the non-plated places, to the point of causing an eventual holing thereof. In employing the substrates which have just been mentioned, the contact zones of the electrodes should thus be covered by a material which is insensitive to the acid employed for the anodization. This operation, on the other hand, is not necessary if the substrate is of cast aluminium which is insensitive to said acid. This fact further confirms the preference given to the object manufactured according to Example Nr. 1. It is self-evident that in all the cases taken as example, the contact points will be chosen in places where they are not apparent, for instance at the interior of the case, should it concern a watch case

What I claim is:

1. A decorative and/or useful object intended particularly for use in horology or jewelry including a metallic substrate constituting the framework of the object and a protective coating overlaying said substrate, at least in part to render it insensitive to external constraints which may occur, said coating including a first layer of aluminium in a substantially pure state and a second layer capping the first, said second layer being constituted of aluminium oxide formed from the first layer.

2. An object as set forth in claim 1 wherein the substrate is formed from injected cast aluminium containing between 5% and 22% by weight of silicon.

3. An object a set forth in claim 1 wherein the substrate is formed from injected cast zinc.

4. An object as set forth in claim 1 wherein the substrate is formed from steel.

5. An object as set forth in claim 1 wherein the substrate is formed from brass.

6. An object as set forth in claim 1 wherein the first layer is a galvanic deposit containing less than 0.5% of silicon by weight.

7. An object as set forth in claim 1 wherein the second layer is coloured.

8. An object as set forth in claim 1, said object being a watch case.

9. An object as set forth in claim 1, said object being a bracelet link.

* * * * *